CONTAINER USEFUL FOR MERCHANDISING AND STORAGE

Filed March 9, 1965 5 Sheets-Sheet 1

Dec. 20, 1966 M. DONOVAN 3,292,841

CONTAINER USEFUL FOR MERCHANDISING AND STORAGE

Filed March 9, 1965 5 Sheets-Sheet 2

Dec. 20, 1966 M. DONOVAN 3,292,841

CONTAINER USEFUL FOR MERCHANDISING AND STORAGE

Filed March 9, 1965 5 Sheets-Sheet 4

CONTAINER USEFUL FOR MERCHANDISING AND STORAGE

Filed March 9, 1965 5 Sheets-Sheet 5

United States Patent Office 3,292,841
Patented Dec. 20, 1966

3,292,841
CONTAINER USEFUL FOR MERCHANDISING AND STORAGE

Marion Donovan, 435 E. 52nd St., Southport, Conn. 10022

Filed Mar. 9, 1965, Ser. No. 438,221
10 Claims. (Cl. 229—16)

This invention relates to containers such as boxes, useful in the merchandising of articles, for example, articles of clothing or shoes, and which are so constructed as also to be useful for storage of articles in readily accessible and visible manner. The present invention will be described in connection with shoe boxes, but its utility for other widely used types of boxes will be apparent.

Shoe boxes adapted to contain a single pair of shoes may be of various specific constructions, but irrespective of such variations the most widely used boxes are similar in their general construction in that they are of the telescopic type consisting of two major parts, namely, a body portion having an open top and a cover portion comprising a tray with relatively narrow flanges adapted to telescope over the outside surfaces of the top of the body. Generally, these boxes are of the set-up type, although in some instances either the body or the cover, or both, may be of the folding type. The present invention is adaptable to telescopic boxes of either the set-up or folding type.

Purchasers of shoes or similar merchandise normally dispensed in telescopic boxes, often find it desirable to store the purchased articles in the box in which they were purchased. When several such boxes are stored in a closet, for example, and a person wishes to locate a particular article or pair of shoes, it usually is necessary to remove the cover from a number of boxes. If several such boxes are stacked it has been necessary to remove the boxes individually from the stack for the purpose of opening them. It is one of the objects of the present invention to provide a telescopic box of any one of several conventional basic constructions which has perforations and/or other features such as slits, tabs, score lines, releasable adhesive patterns and the like, associated with certain of the panels thereof, whereby the panels of one or both ends of the box and cover may be cut along the perforations or score lines, or adhesive patterns may be released, to form flaps which may be folded in both the body and the cover to convert the box to an open-ended storage box with a reinforced opening, the full size of and end or side wall of the covered box with the remaining panels of the body and top cooperating with the flaps to hold the same in opened position. When thus converted, the box will afford the user a view of and access to the particular pair of shoes or other contents in the box, and a plurality of such boxes may be stacked to form a convenient multicellular storage facility. As will be apparent certain of the flaps and tabs provided by the present invention may be interlocked not only with the associated box or cover but also may be interlocked with adjacent boxes or covers whether above, below or alongside the box or cover in which such flaps or tabs are formed.

The invention will be more fully understood from the following description of preferred forms thereof, together with the accompanying drawings. In the drawings.

Figures 1, 2, 3:
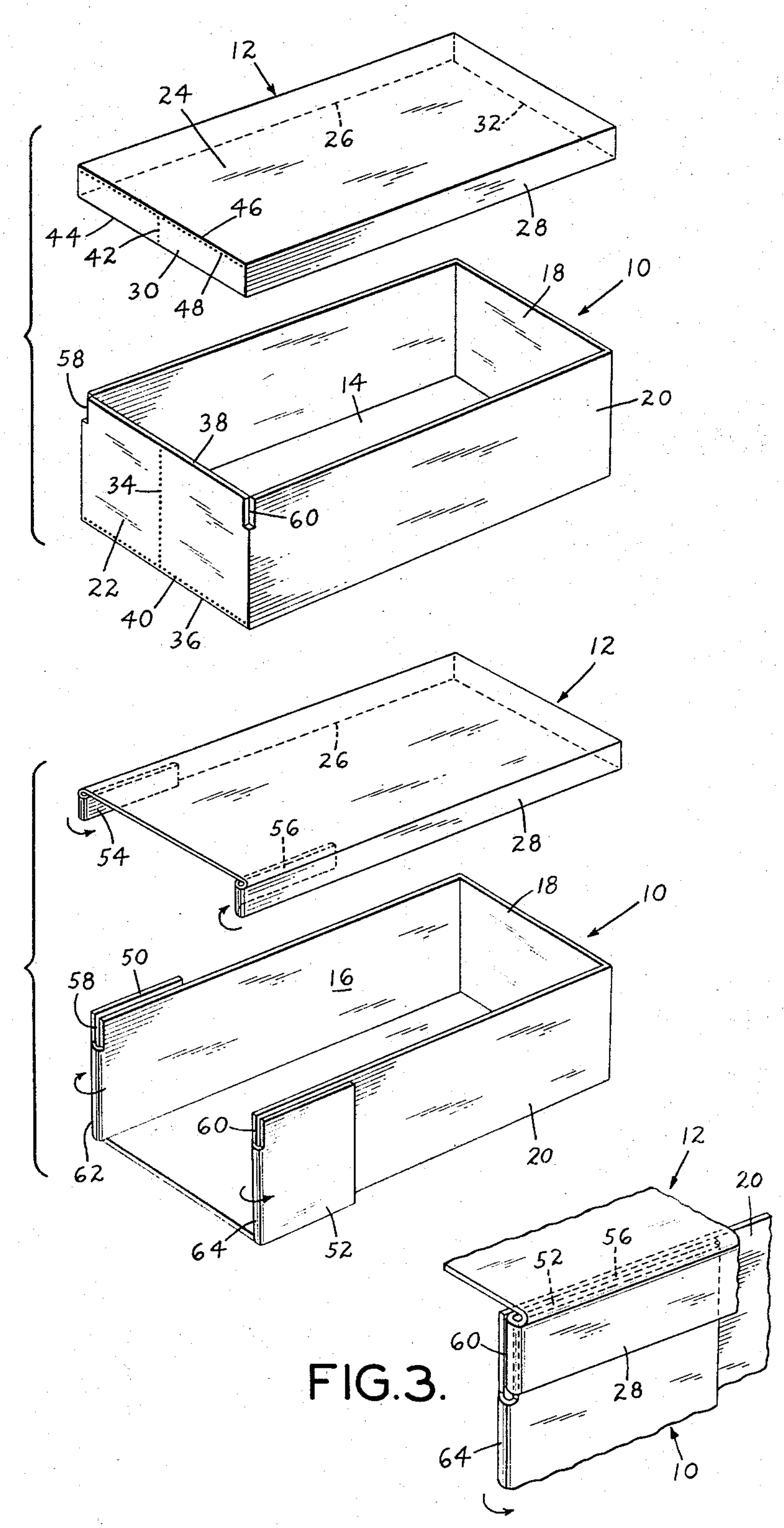
FIGURE 1 is an exploded perspective view of a box embodying the present invention, showing the same in the condition in which it is used for the shipment and merchandising of contents.
FIGURE 2 is a view similar to FIG. 1 showing the box converted, in accordance with the present invention, for use as a storage box.
FIGURE 3 is an enlarged, detail view illustrating the relative positions of parts when the box, as shown in FIG. 2, is assembled for storage use.

Referring now to the drawings, in FIG. 1 is shown a box comprising a body 10 and a cover 12. The body 10 includes a bottom panel 14 and wall panels 16, 18, 20 and 22. For convenience, the wall panels 16 and 20 will be referred to herein as side wall panels, and the wall panels 18 and 22 will be referred to as end wall panels, although it will be understood that the distinction between side and end walls may lie largely in the dimensional proportions of the box and there may be no such distinction in a box in which all of said panels are of the same size. The box illustrated in FIG. 1 is of the general proportions of a shoe box, and thus is rectangular in horizontal cross section whereby the side wall panels 10 and 16 are of greater length than the end wall panels 18 and 22.

The cover 12 shown in FIG. 1 includes a top panel 24, side flange panels 26 and 28, and end flange panels 30 and 32. The cover 12 is thus a relatively shallow tray and its dimensions are such, relative to the dimensions of the body 10, that the flanges 26, 28, 30 and 32 may be telescoped over the outer upper edge portions of the wall panels of the body 10 to serve as a telescopic closure of familiar form.

The body 10 and cover 12 of the box shown in FIG. 1 may be of any conventional construction, certain illustrative forms of which are disclosed hereinbelow, and they may be made of any of the usual materials such as cardboard, boxboard, fiberboard, or the like.

For the purposes of the present invention the box illustrated in FIG. 1 is provided with certain features which in no way interfere with the function of the box as a container for the protection and enclosure of contents during shipment to points of distribution and transportation to a user's home, and which make it possible for the user or retailer, for example, to convert the box into an open ended storage container, if so desired. As shown in FIG. 1, the end wall panel 22 of the body of the box is provided with a line of weakening 34 which may consist of perforations for example, extending vertically and centrally of said panel 22 from the bottom fold line 36 to the upper edge 38 thereof. The end panel 22 is also provided with a line 40 of perforations or similar weakening, extending horizontally in substantial coincidence with the fold line 36 along the bottom edge of the body 10.

Similarly, the cover 12 has a line 42 of perforations or similar weakening, extending vertically and centrally of the end flange panel 30 from the lower edge 44 of said panel to the fold line 46 at the top of said panel. The panel 30 also is provided with a line 48 to perforations, for example, extending horizontally and generally coincident with the fold line 46.

When it is desired to convert the box shown in FIG. 1 to a storage container, the cover 12 is removed from the body 10 and the end wall 22 of the body 10 is severed along the lines of weakening or perforations 34 and 40 whereby to form two separate flaps 50 and 52 which are folded outwardly and backwardly into face-to-face contact with the outer surfaces respectively of the side walls 16 and 18 of the body 10. Similarly, the end flange panel 30 of the cover 12 is severed along the lines of perforations 42 and 48 to form two separate flaps 54 and 56 which are folded inwardly and back into face-to-face contact respectively, with the side flange panels 26 and 28, as shown in FIG. 2.

Preferably, the body 10 is provided with slots 58 and 60, see FIG. 1, extending downwardly from the upper corners of the box body 10 between the end panel 22 and the adjacent side wall panels 16 and 20. The slots 58 and 60 are of a depth, measured from the upper edges of the body 10, which is substantially equal to the vertical dimension of the flanges 26 and 28 of the cover 12. Thus, when the box is prepared for conversion to a storage container as illustrated in FIG. 2, the slots 58 and 60 are in such a position as to permit the insertion of the flaps 54 and 56 respectively of the cover 12 between the flaps 50 and 52 and the adjacent side walls of the body 10, whereby the cover 12 may be placed in the position illustrated in FIG. 3. In said FIG. 3 it will be observed that the cover 12 is telescoped over the outside surfaces of the body 10 around three sides of the box. Also, the side flanges 26 and 28 of the cover 12 are telescoped over the upper portions of the flaps 50 and 52 of the body 10 whereby the flaps 50 and 52 serve to confine the flaps 54 and 56 of the cover 12.

It will be apparent from FIG. 3 that when the box is converted to an open-ended container, the vertical sides of the open end are reinforced not only as a result of the doubling of thickness resulting from the folding of the flaps 50 and 52, but also is further stiffened by virtue of the 180° fold lines 62 and 64 defining the vertical margins of the open end of the box body 10. A similar reinforcing effect exists in connection with the vertical portions of the cover 12. This vertical reinforcement makes it possible to stack a relatively large number of such boxes with contents therein without fear of collapsing of the side walls.

As indicated above, the box so far described may be of any specific conventional construction, and it may be of the set-up or folding type. For better understanding of the invention the same will be described in connection with a few of the most widely used boxes of the set-up type. For example, in FIG. 4 there is illustrated a blank of generally cruciform shape from which the body of such a box may be erected. The blank 110 therein illustrated includes a bottom panel 114, a side wall panel 116 connected with the bottom panel 114 along a score line 117, and a side wall panel 120 connected with the bottom panel 114 along a score line 121. The blank 110 also is provided with an end panel 118 connected with the bottom panel 114 along a score line 119, and an end panel 122 connected with the bottom panel 114 along a line of perforations 123. The end wall panel 122 is divided into two equal parts by a line of perforations 134 which is perpendicular to the line of perforations 123.

Figure 4:
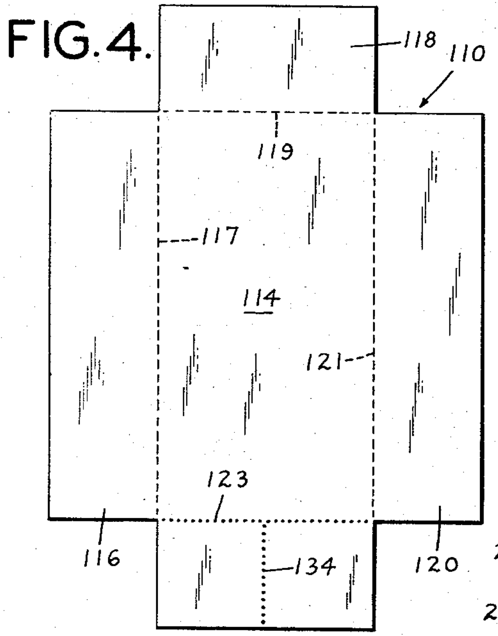
FIGURE 4 is a plan view of one form of blank for the body of a box embodying the present invention.
Figure 5:
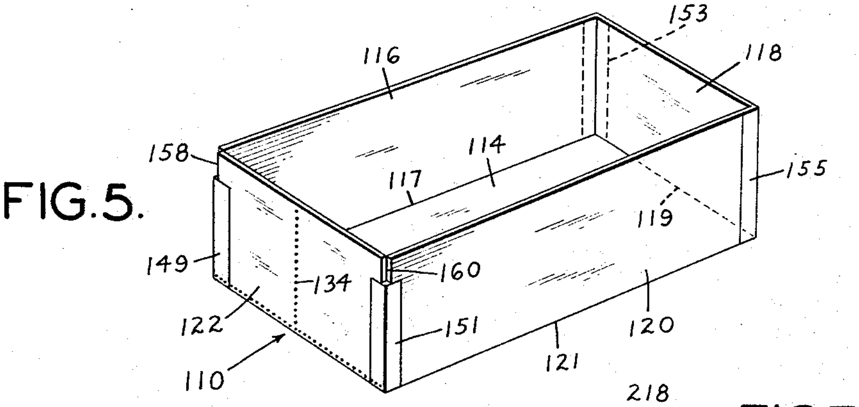
FIGURE 5 is a perspective view of the blank shown in FIG. 4, set up to form a box body.

The blank shown in FIG. 4 may be set up and secured at the corners to form a box body as shown in FIG. 5 in any conventional manner. For example, the panels 116, 118, 120 and 122 may be folded through 90° along the lines 117, 119, 121 and 123 respectively, so that adjacent vertical edges of the panel abut to form corners of the box body 110. The corners may be secured as by applying strips of adhesive coated paper tape, for example. Thus, strips of tape 149 and 151 serve to secure the corners formed by abutment of the panel 122 with the panels 116 and 120. Each strip 149 and 151 extends from the bottom of the box body upwardly to a point which terminates short of the top of the box body by a distance substantially equal to the vertical dimensions of the flanges of the cover which is to be used with the box. This is a convenient way to automatically provide the slots 158 and 160 which correspond with the slots 58 and 60 discussed above in connection with FIGS. 1 through 3. The remaining corners of the box body may be taped by strips of adhesive coated paper 153 and 155 which extend the full height of the box body.

Figure 6:
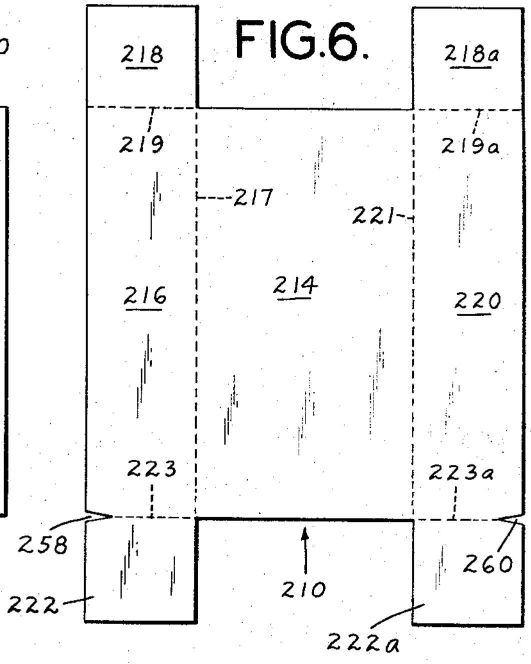
FIGURE 6 is a plan view of a different form of blank for forming the body of a box embodying the present invention.

In FIG. 6 there is illustrated another generally conventional form of blank 210 which is provided with certain features to adapt it for use in the present invention. The blank therein illustrated is provided with a bottom panel 214 and a side wall panel 216 connected with the bottom panel along a score line 217, and a side wall panel 220 connected with the bottom panel 214 along a score line 221. In this form of blank the end wall panels are made up of two separate portions. Thus, the blank 210 is provided with an end wall panel portion 218 connected with the side wall panel 216 along a score line 219, and a complementary panel portion **218*a* connected to the side wall panel 220 along a score line 219*a*. The blank 210 is also provided with an end wall panel portion 222 connected along a score line 223 with the side wall panel 216, and a complementary end wall panel portion 222*a* connected with the side wall panel 220 along a score line 223*a*. The blank 210 is also provided with a cover-receiving slot 258 which extends inwardly of the blank along the score line 223 for a distance substantially equal to the vertical dimension of the flanges of the cover which is to be used with the box body. A similar cover-receiving slot 260 is cut into the blank 210 along the score line 223*a***.

Figure 7:
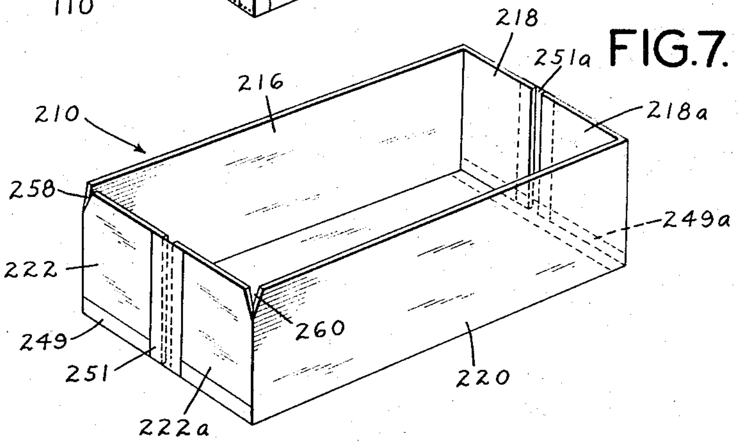
FIGURES 7 is a perspective view of the blank shown in FIG. 6 set up to form the body of the box.

When the blank 210 is erected to form a box body as shown in FIG. 7, the side wall panels 216 and 220 are folded through 90° along the score lines 217 and 221 respectively, and the end panel portions 218, **218*a*, 222 and 222*a* are folded through 90° along their respective score lines so that the inner edges of these panel forming portions will substantially abut, as illustrated in FIG. 7. The body 210 may be secured in erected position by any conventional means. For example, a strip of adhesive coated paper tape 249 may be applied to the outside surface of the panel bottom 214 and to the lower portions of the end wall panel portions 222 and 222*a* to secure the lower corner, and a strip of adhesive coated paper 251 may be applied to the outer surfaces of the abutting marginal areas of the panel portions 222 and 222***a* to hold them in abutting position. Similar strips of adhesive coated paper tape may be applied to the opposite end of the box as indicated at 249*a* and 251*a*. It will be observed that the cover-receiving slots 258 and 260 cut into the blank will now be so positioned as to be available for the purpose pointed out in connection with the slots 58 and 60 shown in FIGS. 1 through 3.

The form of box body illustrated in FIGS. 6 and 7 may be prepared for conversion into a storage container by slitting the paper strips 251 and 249 along the length of the butt joints which they secure together. The end panel portions 222 and 222*a* may now be folded outwardly and back as described above in connection with the flaps 50 and 52 shown in FIG. 2.

Figures 8, 9, 10, 11, 12:
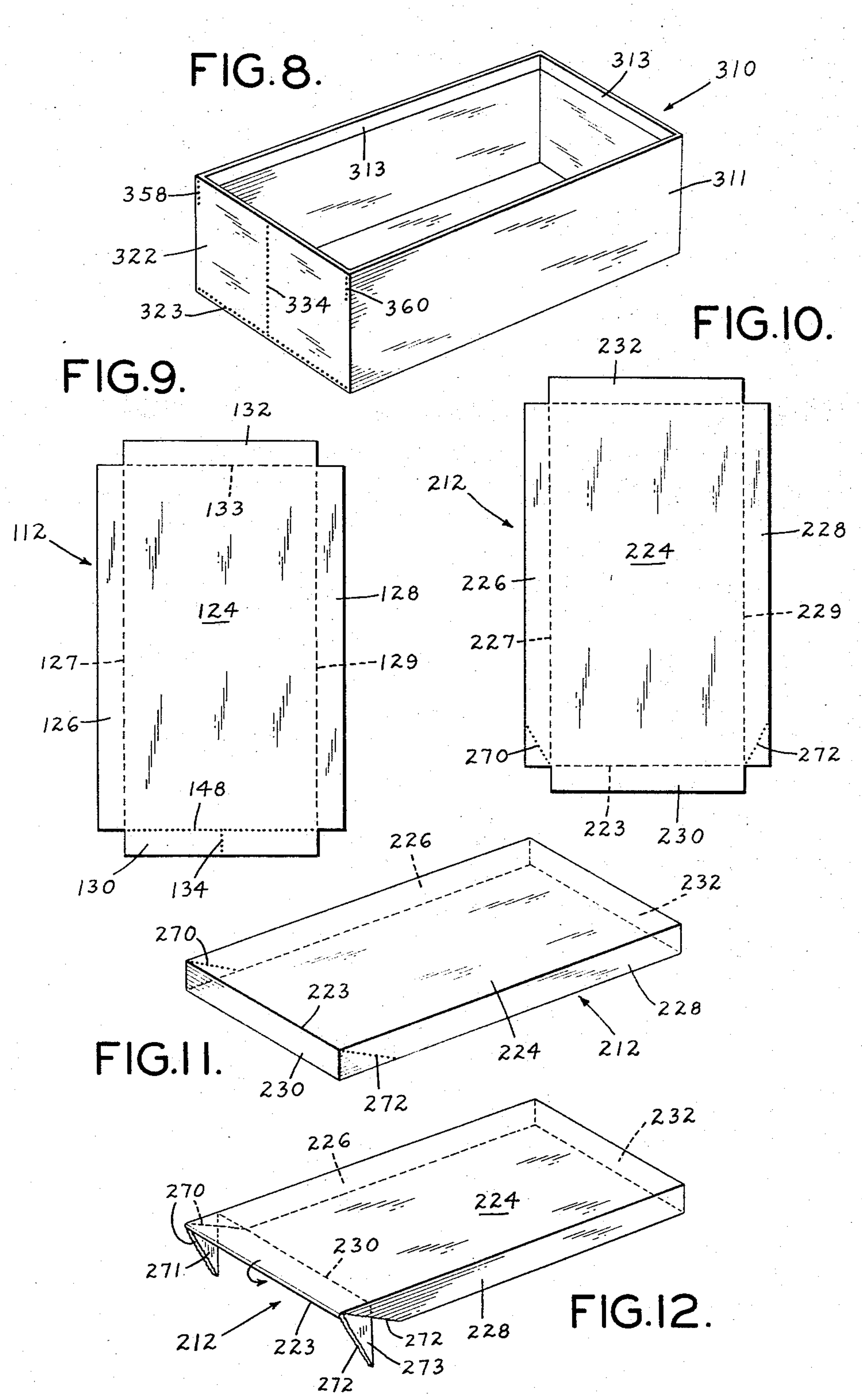
FIGURE 8 is a perspective view of the body of a box which be set up from either of the blanks illustrated in FIG. 4 or FIG. 6, and which has had applied thereto a cover paper of conventional form on which is printed certain indicia facilitating conversion of the box to a storage container.
FIGURE 9 is a plan view of one form of blank for the cover of a box embodying the present invention.
FIGURE 10 is a plan view of a different form of blank for a cover of a box embodying the present invention.
FIGURE 11 is a perspective view of the blank shown in FIG. 10, set up to form a box cover.
FIGURE 12 is a perspective view of the box cover shown in FIG. 11, converted in accordance with the pres-invention for use with an appropriate box body to form a storage container.

It is customary in connection with shoe boxes and similar telescoping boxes of the general type to which this invention pertains, to make the same from relatively stiff, low cost materials, such as cardboard, which frequently are of a dull or unattractive color, and accordingly such boxes are quite frequently covered with an adhesively secured layer of cover paper of a desirable color and bearing decorative or informative printed indicia. This practice may be followed in connection with any of the forms of the invention illustrated herein. The cover paper may be sometimes relied upon to hold the box in erected position, but in many cases the box is first taped, as described above in connection with FIGS. 5 and 7, and is thereafter covered with paper. In FIG. 8 a box body 310 is illustrated to which has been applied a cover paper 311. The cover paper 311 is made up of one or more pieces, and is cut to appropriate shape with respect to the particular form of blank which may be used, and details of such construction are not essential for the present disclosure. However, the cover paper 311 usually is folded over the upper edges of the opened mouth of the box body 310 whereby relatively narrow flanges 313 of such cover paper are adhesively secured to the inner surfaces of the wall panels of the body 310. It will be apparent that such cover paper 311 will conceal the lines of weakening, such as the lines of perforations 123 and 134 disclosed in FIGS. 4 and 5, and will conceal the paper tapes 249 and 251 disclosed in FIGS. 6 and 7. It is preferred, therefore, that the cover paper 311 applied to any of the boxes of the present invention be provided with appropriate printed indicia to indicate the location of the lines along which the end panel of the box body may be separated to form the flaps, and the lines where the corners may be cut to form the cover-receiving slots. As shown in FIG. 8, the cover paper 311 may have printed thereon a line of colored dots 334, for example, to indicate the position of the line of perforations 134 concealed therebeneath in a box body such as that shown in FIGS. 4 and 5, or the line of abutment between the end panel portions 222 and 222*a* in a box such as that shown in FIGS. 6 and 7. Also, the cover paper 311 may have printed thereon a row of colored dots 323 to indicate the location of the line of perforations 123 when a box such as that shown in FIGS. 4 and 5 is used, or to indicate the line of abutment between the bottom panel 214 and the end panel portions 222 and 222*a* when a box such as that shown in FIGS. 6 and 7 is used. The cover 311 may also have a line of dots printed at the upper opposite corners of the end panel 322, such lines of dots being indicated at 358 and 360. The dots 358 and 360 serve to indicate the position of the corner slots 158 and 160 shown in FIGS. 4 and 5 or the corner slots 258 and 260 shown in FIGS. 6 and 7. The user of the box thus will be enabled to sever the box along the lines of colored dots 334, 323, 358 and 360 preparatory to conversion of the box to a storage container in accordance with the present invention.

The cover 12 illustrated in FIG. 1 may be formed from any conventional blank, and in particular may be formed from blanks of either of the forms already described in connection with the box body illustrated in FIGS. 4 and 5 and FIGS. 6 and 7 respectively. Thus, in FIG. 9 there has been shown a cruciform blank 112 having a top panel 124 and side flange panels 126 and 128 connected respectively, with the top panel 124 along score lines 127 and 129. The blank 112 also has end flange panels 130 and 132 connected with the top panel 124 along a line of perforations 148 and a score line 133, respectively. The end flange panel 130 of the blank 112 is provided with a line of perforations 134 which extends perpendicularly from the outer edge of said panel to the line of perforations 148. The line of perforations 134 is located centrally of the length of the end flange panel 130 whereby said panel may be severed to form flaps corresponding with the flaps 54 and 56 illustrated in FIG. 2. The blank 112 may be set up and secured in set-up condition by the application of paper tape, all as described above in connection with the setting up of the body blanks 110 and 210. The cover blank 112 may be made of any of the materials hereinabove discussed, and in many instances it may have applied thereto a cover paper corresponding generally with the cover paper 311 discussed in connection with the box body 310 shown in FIG. 8. In such event, it may be desired to provide the cover paper with suitable indicia, such as lines of colored dots, to indicate the location of the lines of perforations 134 and 148 which would be concealed by such cover paper.

It will be understood that a cover suitable for use in accordance with the present invention may be made from a blank other than the cruciform blank just described. For example, an H-shaped blank of the general type shown in FIG. 6 may be used. In such event the taping and covering procedure for the cover will be substantially the same as hereinabove described in connection with the box body shown in FIGS. 6 and 7.

In FIG. 10 there is illustrated another form of cover blank 212 which is of particular utility in connection with any of the forms of the box bodies described hereinabove. The cover 212 is made up from a blank having a bottom panel 224 and side and end flange panels 226, 228, 230 and 232 respectively, connected to the bottom panel along appropriate score lines 227, 229, 223 and 233. The side flange panels 226 and 228 are provided with lines of perforations 270 and 272 which extend angularly across the panels from the points of intersection of the score line 223 with the score lines 227 and 229, respectively. The specific degree of angularity of score lines 270 and 272 is not critical, but preferably the angle between such lines of perforations and an extension of the score line 223 lies within a range of from about 45° to about 70°, for reasons which will become apparent hereinbelow.

The blank shown in FIG. 10 is erected into the form shown in FIG. 11 and may be secured by paper tape and covered with a cover paper, all as described above in connection with the preceding figures. Also, when a cover paper is used, it may be provided with lines of colored dots to indicate the location of the lines of perforations 270 and 272 concealed therebeneath.

When it is desired to convert the cover 212 shown in FIG. 11 for use as a part of a storage container in accordance with the present invention, the same is severed along the lines of perforations 270 and 272 whereupon triangular flaps 271 and 273 are released. The flaps 271 and 273 are first bent outwardly and forwardly from the position shown in FIG. 11, after which the end flange panel 230 is folded inwardly and upwardly along the score line 223 so as to lie in face-to-face contact with the under surface of the top panel 224 as shown in FIG. 12. The triangular flaps 271 and 273 are thus forced inside the side flanges and extend downwardly as shown in FIG. 12. If the angle of the lines of perforations 270, 272 is greater than 45° as discussed hereinabove, the triangular flaps 271 and 273 will have a greater length than width, and thus will extend downwardly for a distance somewhat greater than the vertical dimension of each of the flange panels 226 and 228 from which they were severed.

The converted cover illustrated in FIG. 12 may be assembled with the converted box body illustrated in FIG. 2 by inserting the triangular tabs 271 and 273 between the side walls of the box body and the outwardly turned flaps 50 and 52, and positioning the remaining portions of the side flanges 226 and 228 of the cover outside the flaps 50 and 52 of the body. It will be apparent that the cover shown in FIG. 12 may be similarly assembled with converted box bodies made in accordance with FIGS. 5, 7, 8, 13 or 16. The particular form of cover shown in FIGS. 11 through 12 presents certain advantages over the forms of covers hereinabove discussed in that the end flange panel 230 serves to reinforce the edge portion of the cover which defines the top of the access opening to the converted container. As pointed out above, such reinforcement is the result not only of doubling of thickness of the edge portion, but also is the result of the stiffening effect achieved by the 180° fold along the score line 223.

Figure 13:
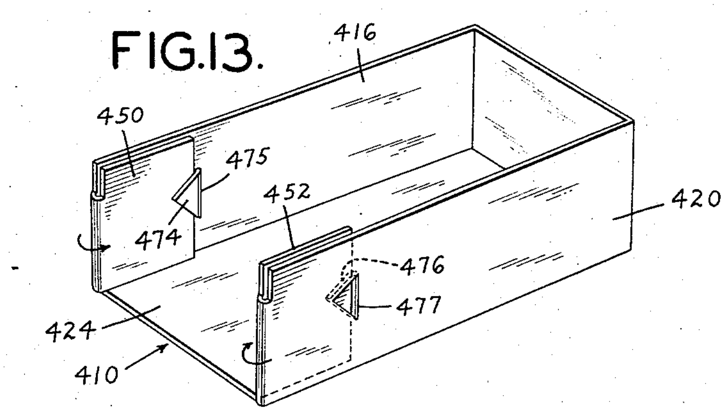
FIGURE 13 is a view similar to FIG. 1 illustrating a modification of the invention.

In FIG. 13 there is illustrated a modification which may be used in connection with any of the forms of box bodies hereinabove described. As shown in this figure, the flaps 450 and 452 which are formed by severing the end wall panel and separating the same from the bottom panel 424, all as described above, are folded inwardly of the box body 410 rather than outwardly as hereinabove described. In such event the side flanges of the covers hereinabove described, would not be effective to hold said flaps 450 and 452 in their inwardly folded position, and accordingly the side wall panels 416 and 420 have formed therein locking tongues 474 and 476 which may be cut in triangular or arcuate shape, and adapted to be bent along score lines 475 and 477. The locking tongues 474 and 476 are so positioned that they may be bent inwardly when the flaps 450 and 452 are folded and permitted to spring back to lock the inwardly folded flaps 450 and 452 in the illustrated position. Any of the covers hereinabove described may be used with this form of the invention, and the flaps 54 and 56 of the cover shown in FIG. 2, or the triangular flaps 271 and 273 of the cover shown in FIG. 12, may be inserted between the side walls of the body 410 and the associated body flaps 450 and 452.

Figure 14:
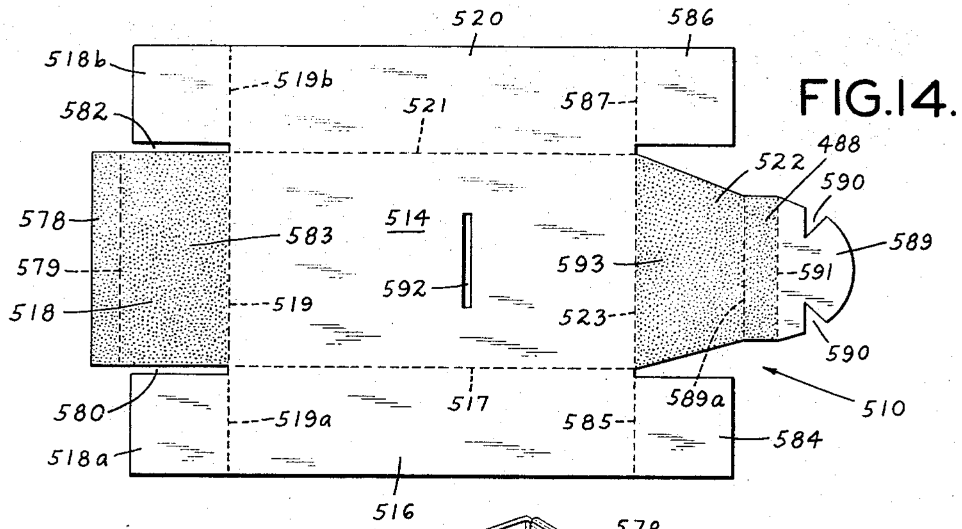
FIGURE 14 is a plan view of still another form of blank for forming the body of a box embodying the present invention, and in which a modified form of the present invention is utilized.
Figures 15, 16:
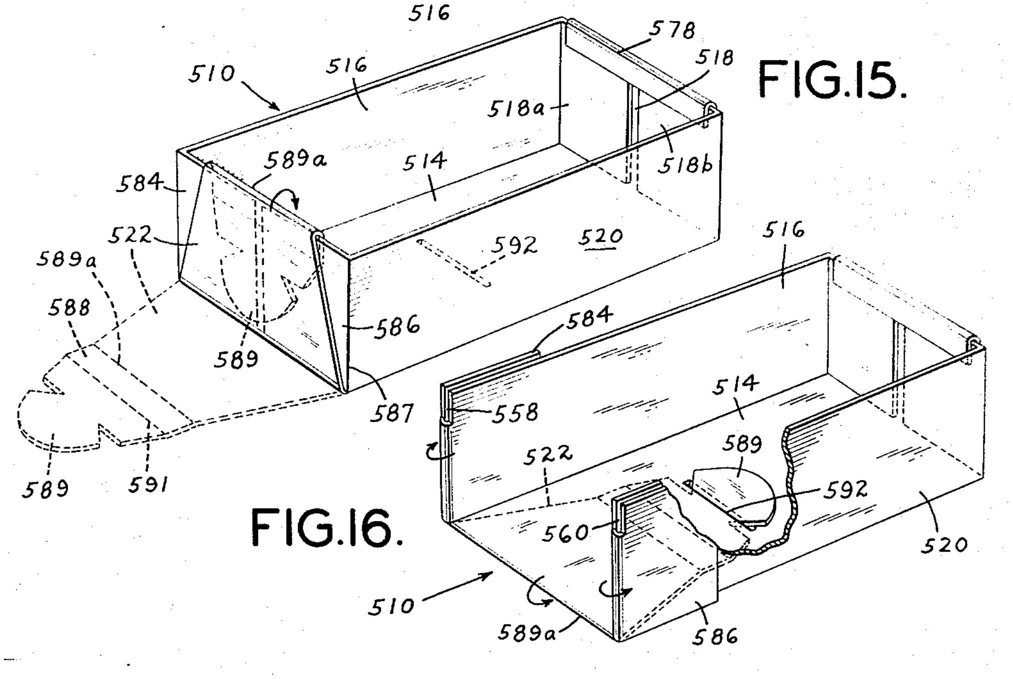
FIGURE 15 is perspective view of the blank shown in FIG. 14, set up for the shipping and merchandising of contents.
FIGURE 16 is a perspective view of the box body shown in FIG. 15, converted for use with an appropriate cover as a storage container.

In FIGS. 14 through 16 there is illustrated still another form of box body embodying the present invention. This particular form of the invention has been adapted to another rather widely used form of box frequently employed for the merchandising of shoes. Thus, in FIG. 14 there is illustrated a blank 510 which includes a bottom panel 514 and side wall panels 516 and 520 connected with the bottom panel 514 along score lines 517 and 521. In the box body made from this form of blank the end walls are of multiple thickness and the upper edges of the end walls are reinforced by a glue flap. The conventional structure of the blank for such a box body is illustrated in that portion of the blank 510 which includes an outer end wall panel 518 connected with the bottom panel 514 along a score line 519. Integral with the end wall panel 518 there is a glue flap panel 578 connected with the panel 518 along a score line 579. The blank 510 also is provided with inner end wall panel portions **518*a* and 518*b* which are connected along score lines 519*a* and 519*b* with the side wall panels 516 and 520 respectively. The end wall panel portions 518*a* and 518*b* are separated from the outer end wall panel 518 by slots 580 and 582** respectively, which are approximately the thickness of the board from which the box blank is made.

According to the conventional practice, when the blank 519 is erected, the side wall panels 516 and 520 are folded through 90° along the score lines 517 and 521, and the inner end panel portions **518*a* and 518*b* are folded through 90° along the score lines 519*a* and 519*b* so as to extend inwardly toward one another as illustrated at the right-hand end of FIG. 15. The inner surface of the outer end wall panel 518 and the inner surface of the glue flap 578 are both coated with adhesive 583 after which the outer end panel 518 is folded through 90° along the score line 519 to bring the adhesive thereon into contact with the outer surfaces of the panel portions 518*a* and 518*b*. The glue flap 578 is then folded along the scoreline 579 over the upper edges of the panel portions 518*a* and 518*b*** to securely hold the various components of the end wall together and to present a smooth reinforced edge along the top thereof.

To provide a box body having the construction just described, and which is convertible to a storage container in accordance with the present invention, the end of the body opposite to the one just described in detail has been modified, as will now be described. At the lower end of the blank 510 as viewed in FIG. 14, there are provided inner end wall panel portions 584 and 586 connected with the side wall panels 516 and 520 along score lines 585 and 587. An outer end wall panel 522 is connected with the bottom panel 514 along a score line 523, and a glue flap 588 is connected with the outer end wall panel 522 along a score line **589*a*. Preferably, the panel 522 is tapered so as to be substantially narrower along the score line 589*a* than it is along the score line 523. Integral with, and extending beyond the glue flap 588, there is a locking tongue 589 of any suitable form, for example, having locking notches 590 cut therein. A tongue-receiving slot 592 is cut in the bottom panel 514 of the blank for use, as will be described, when the body is converted. The locking tongue 589 is connected with the glue flap 588 along a score line 591. This end of the blank 510 is erected in the same manner as the opposite end, and glue 593 is applied to the inner surface of the outer end wall panel 522 and to the inner surface of the glue flap 588. However, no glue is applied to the locking tongue 589. Thus, when the box is erected as shown in FIG. 15, the glue on the panel 522 and glue flap 588 will hold the box in erected position, and the locking tongue 589 will extend downwardly in contact with, but not glued to, the inner surfaces of the end wall panel portions 584 and 586**.

In all practical respects, the box body 510 shown in FIG. 15 is the equivalent of the conventional structure for the purposes of shipment and transportation of contents. However, it may be readily converted to a storage container by grasping the locking tongue 589 and peeling the glue flap 588, and thereafter the end panel 522, away from the end panel portions 584 and 586. When thus released, the panels 522, 588 and locking tongue 589 form an articulated flap-like structure which may be pulled out to the broken line position shown in FIG. 15, and thereafter folded backwardly beneath the box body along the fold line 523, as illustrated in FIG. 16. The end of the locking tongue 589 is then inserted from the outside of the bottom panel 514 through the locking slot 592. The end panel portions 584 and 586 which have been released by the peeling operation just described, may be folded outwardly and back into contact with the side walls 516 and 520 of the box body where they will serve the same purpose as that illustrated in connection with the flaps 50 and 52 in FIGS. 1 through 3. In this particular form of the invention, cover flange receiving slots 558 and 560 are shown in FIG. 16. These slots may be cut into the blank if so desired, but they have not been shown in FIG. 14 since it may be preferred that the user cut such slots with a knife at the time of conversion.

It will be apparent that the blank 510 shown in FIG. 14 may be modified to form a cover instead of a body, and such a cover may be converted for use with a body to form a storage container. When both cover and body are of the form shown in FIGS. 14 through 16, a particularly strong and durable storage container is provided. All of the edges of the opening into the converted container are reinforced by virtue of doubling of thickness and stiffening along a fold line as discussed above. When the cover is made from a blank similar to the blank 510 in FIG. 14, the portions of the flange which are uncovered by peeling of the other portions thereof, as described above, will comprise flaps hinged to the adjacent flanges in the same manner as the flaps 584 and 586 shown in FIGS. 14 through 16. However, it will be understood that the cover flaps will be folded inwardly to interlock with the box body 510 in the same manner as illustrated in connection with the cover flaps 54 and 56 as shown in FIGS. 2 and 3. Also, it will be understood that any of the covers herein illustrated or described may be used with any of the box bodies in the design of a container embodying the features of the present invention.

While the adhesive used at the convertible end of the container illustrated in FIGS. 14 through 16 may be of any conventional type and may be spread in a layer of customary thickness over the entire area of the glue zones illustrated in said figures, it will be understood that the particular adhesive and/or amount thereof used may be selected to provide adequate but not excessive original strength. In this manner peeling in the manner peeling ing the manner described above may be accomplished with a minimized tendency toward delamination of the paperboard from which the box is made. Similarly, the areas of glue bonding may be reduced or change in shape from conventional practice, if so desired, for the same purpose.

In certain instances it may be desirable to provide for conversion of the container shown in FIGS. 14 through 16 from a shipping to a storage condition and then back to shipping condition. For this purpose the adhesive may be of a temporary, or reusable, type rather than a glue which sets up in a permanent fashion. Thus, the glue flap 588 and the outer end wall panel 522 may be coated with a pressure-sensitive rubber cement or similar material whereby a temporary bond may be formed for shipping purposes and the container may be converted to storage condition and back again repeatedly as may be desired.

Figures 17, 18:
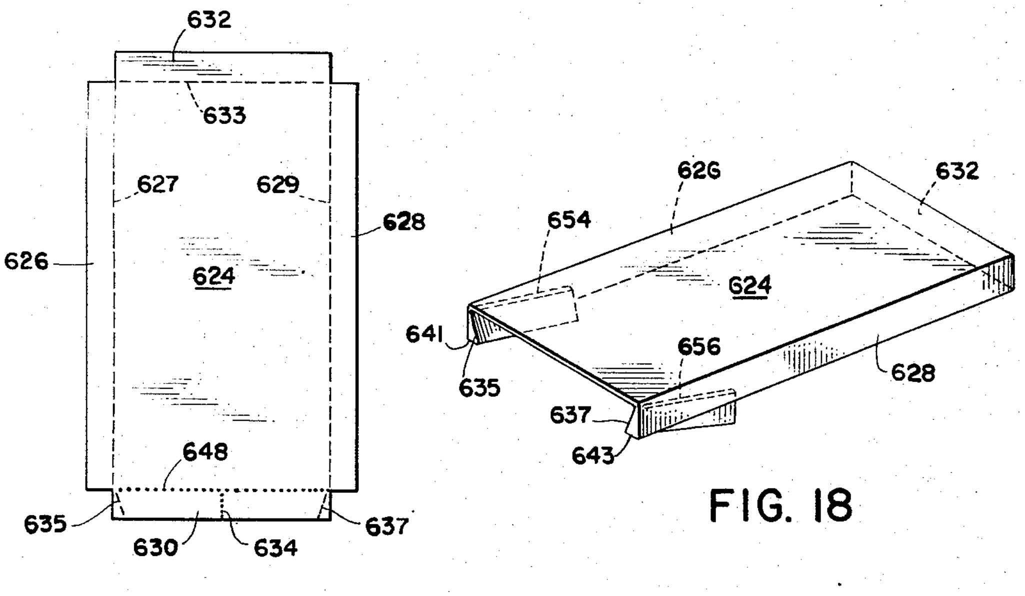
FIGURE 17 is a plan view of a blank for a cover of further modified form useful with any of the box bodies shown herein.
FIGURE 18 is a perspective view of a cover erected from the blank of FIGURE 17 and converted for use as a cover for a storage container.

The further modified form of cover shown in FIGS. 17 and 18 affords certain advantages over the covers described above. In FIG. 17 the blank 612 is similar to that shown in FIG. 9 in that it comprises a top panel 624, side flange panels 626 and 628, and end flange panels 630 and 632. The end flange panel 630 is provided with a line of perforations 634 positioned centrally of the length of the panel 630 and extending from the outer edge of said panel perpendicularly to a line of perforations 648 which separate the panel 630 from the top panel 624. The other end panel 632 and the side flange panels 626 and 628 are separated from the top panel 624 by score lines 633, 677 and 629 respectively.

The blank shown in FIG. 17 differs from that shown in FIG. 9 in that the end flange panel 630 is provided with additional score lines 635 and 637 which extend at an acute angle with respect to the respective ends of the panel 630 beginning at the point of intersection between said ends and the ends of the side flange panels 626 and 628.

When the blank of FIG. 17 is erected it will serve as a cover for a shipping and merchandising box in the same manner as any of the other covers described herein. When it is desired to convert it for use with a storage container including any of the converted boxes herein disclosed the lines of perforation 634 and 648 are served and tabs 654 and 656 are folded inwardly along the angularly disposed score lines 635 and 637 respectively into the positions shown in FIG. 18. As a result the tabs 654 and 656 will extend downwardly at an angle relative to the respective side flanges 626 and 628 whereby triangular portions of such tabs will hang below the side flanges as shown in FIG. 18. Such triangular portions thus will be very readily accessible for insertion into the spaces between the flaps 50 and 52 of FIG. 2, for example, and the side panels 16 and 20 of the converted box body. The added convenience of the cover shown in FIG. 18 over that shown in FIG. 2, for example will be readily apparent.

Furthermore, since the tabs 654 and 656 of FIG. 18 have been folded along slanting score lines 635 and 637 respectively the tabs will be spaced away from the associated side flanges, particularly toward the lower ends of the score lines 635 and 637. There are triangular portions having bases 641 and 643 respectively of the end flange panel 630 which remain substantially in their original plane. This provides a sort of funnel at each corner with ample room for receiving the upper edges of the flaps 50 and 52 of FIG. 2, for example, when the container is being assembled as a storage container.

Figure 19:
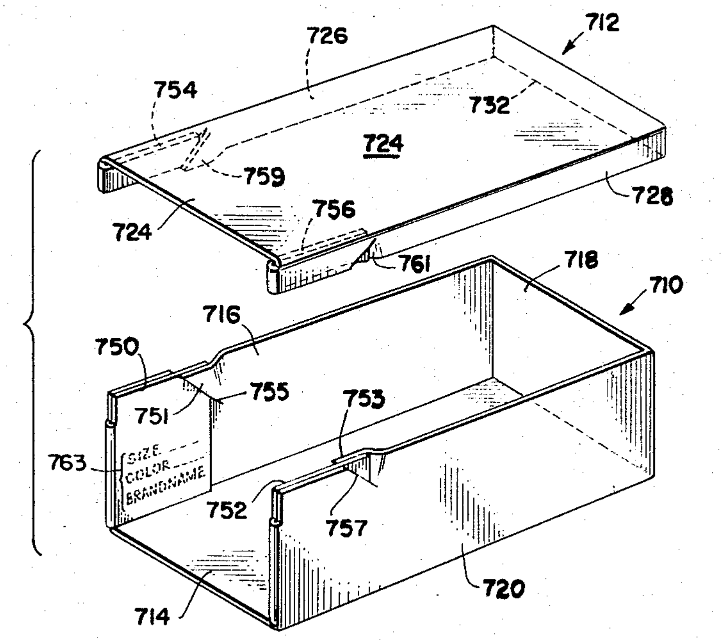
FIGURE 19 is an exploded perspective view of a box body and cover of still another modified form.

In FIG. 19 there is shown a further modication of the present invention which may be adapted to both box body and cover, as shown in said FIG. 19, or which may be embodied in either the box body or cover for use with other forms of the invention. In FIG. 19 the box body 710 includes side panels 716 and 720, an end panel 718 and a bottom panel 714. Flaps 750 and 752 have been folded inwardly to be held in position by tongues 751 and 753 formed respectively by cutting angularly disposed slits 755 and 757 into the upper edges respectively of the side panels 716 and 720. Any of the box tops described herein may me assembled with the converted box body 710 shown in FIG. 19 by inserting the tabs 54, 56 of FIG. 2 or 271, 273 of FIG. 12 or 654, 656 of FIG. 18 for example between the inwardly folded flaps 750 and 752 and the associated side wall panels.

The cover 712 shown in FIG. 19 is of the same construction as the box body 710 shown in that figure. Thus, the cover includes side flanges 726 and 728, an end flange 732 and a top wall 724. Tabs 754 and 756 are folded inwardly and caught by tongues 759 and 761 respectively which are formed by angular slitting of the flanges as above described in connection with the box body shown in FIG. 19.

The cover 712, converted as shown in FIG. 19 for use with a storage container, is telescoped upon the box body with the tabs 754 and 756 thereof inserted between the flaps 750 and 752 and the associated wall panels 716 and 720 respectively. This form of the invention, in which the flaps 750 and 752 are folded inwardly offers the advantage that information or identification 763 originally printed on the outside of the end wall from which flaps 750 and 752 are formed will remain visible just inside the open end of the converted storage container.

While, as noted above it is preferred to provide covers which are convertible as disclosed herein, it will be recognized that any standard cover may be placed upon any of the converted box bodies shown herein. When a standard cover is used the end flange which is not cut or folded to form tabs will project downwardly over the open end of the converted box body, thus reducing the useful area of such opening but such reduction may not be objectionable under particular circumstances or for the storage of particular types of goods.

In this specification the hinged elements which are formed in both the box body and the cover for conversion of the container from a telescoping box to an open-ended storage container, have been referred to as "flaps" or as "tabs." To avoid confusion in the claims these elements will be defined as "flaps" when they are in the box body and will be defined as "tabs" when they are in the cover. Thus, the hinged elements 50 and 52 in the box body 10 illustrated in FIG. 2, as well as the corresponding elements in the modifications illustrated herein, will be called "flaps" whereas the hinged elements 54 and 56 in the cover will be called "tabs."

I claim:

1. In a container comprising a box body and a telescoping cover, said box body having a pair of vertically disposed side walls, a pair of vertically disposed end walls, a bottom wall and an open top, and said cover having a top wall and a plurality of vertically disposed flanges adapted to telescope over the upper edge portions of the outer surfaces of the side and end walls of said box body to position the top wall of said cover over the open top of said box body, the improvement which comprises means provided in said box body for facilitating separation of one of said end walls of said box body into relatively movable portions comprising a pair of flaps separated from the bottom wall of said box body and hinged along vertical lines respectively to the side walls of said box body adjacent said end wall, said flaps being foldable respectively into face-to-face contact with said side walls whereby to form an access opening in said box body in the area formerly closed by said end wall, means provided in said box body for facilitating the formation of a slot extending downwardly from the open top of said box body along each of said hinge lines for a distance substantially equal to the vertical dimension of the flanges of said cover, and means provided in said cover for facilitating the separation along predetermined lines of portions of at least one flange thereof to form a pair of tabs hinged to said cover, and said tabs being foldable into positions in which they are insertible respectively into said slots and into frictional engagement between said separated and folded flaps and the side walls against which said flaps are folded to hold said cover in position upon said box body.

2. In a container comprising a box body and a telescoping cover, said box body having a pair of vertically disposed side walls, a pair of vertically disposed end walls, a bottom wall and an open top, and said cover having a top wall, a pair of vertically disposed side flanges and a pair of vertically disposed end flanges, said side and end flanges being adapted to telescope over the upper edge portions of the outer surfaces of the side walls and the end walls respectively of said box body to position the top wall of said cover over the open top of said box body, the improvement which comprises means provided in said box body for facilitating the separation of one of said end walls along a line extending substantially vertically and centrally of said end wall and along a line substantially coinciding with the intersection between said end wall and the bottom wall of said box body to form a pair of flaps hinged along vertical lines respectively to the side walls adjacent said end wall, said flaps being foldable outwardly of said box body along said hinge lines to lie respectively in face-to-face contact with the outer surfaces of said side walls whereby to form an access opening into said box body in the area formerly closed by said end wall, means defining a slot extending downwardly from the open top of said box body along each of said hinge lines for a distance substantially equal to the vertical dimension of the flanges of said cover, and means provided in said cover for facilitating the separation of one of said end flanges along a line extending substantially vertically and centrally of said end flange and along a line substantially coinciding with the intersection between said end flange and the top wall of said cover to form a pair of tabs hinged along vertical lines respectively to the side flanges adjacent said end flange, said tabs being foldable inwardly of said cover along said hinge lines to lie respectively in face-to-face contact with the inner surfaces of said adjacent side flanges whereby to form an access opening into said cover in the area formerly closed by said end flange, said separated and folded tabs being insertible respectively into said slots to position said cover upon said box body with said side flanges telescopically overlying said separated and folded flaps and said tabs frictionally confined between said flaps and the side walls against which said flaps are folded.

3. A container in accordance with claim 1 wherein said box body and said cover are constructed from cardboard having cover paper laminated to at least a substantial portion of the outer surfaces thereof, and wherein both of said means for facilitating separation includes means on the outer surface of said cover paper to visually indicate the lines along which separation may be performed.

4. A container in accordance with claim 2 wherein said box body and said cover are constructed from cardboard having cover paper laminated to at least a substantial portion of the outer surfaces thereof, and wherein both of said means for facilitating separation includes means on the outer surface of said cover paper to visually indicate the lines along which separation may be performed.

5. A container in accordance with claim 1 wherein said flaps are foldable inwardly of said box body into face-to-face contact with the inner surfaces respectively of the side walls to which said flaps are hinged, and wherein said box body is provided with locking means for holding said flaps in said folded position.

6. A container in accordance with claim 1 wherein said means for facilitating the separation of at least one of the flanges of said cover comprises a line of weakening formed in each of said side flanges extending respectively from the point of intersection of the side panel in which each line of weakening is formed with one end flange and the top wall of said cover at an angle of from about 45° to about 60° with the line of intersection between each side flange and said one end flange and extending to the lower edge of the side flange in which said line of weakening is formed, whereby separation of said side flanges along said lines of weakening results in formation of said tabs in triangular shape, and adapts said one end flange to be folded inwardly of said cover to place the tabs hinged to said one end flange in vertical planes appropriate for reception in the slots formed in said box body.

7. In a container comprising a box body and a telescoping cover, said box body having a pair of vertically disposed side walls, a pair of vertically disposed end walls, a bottom wall and an open top, and said cover having a top wall, a pair of vertically disposed side flanges and a pair of vertically disposed end flanges, said side and end flanges being adapted to telescope over the upper edge portions of the outer surfaces of the side walls and the end walls respectively of said box body to position the top wall of said cover over the open top of said box body, the improvement which comprises means provided in said box body for facilitating the separation of one of said end walls into relatively movable portions including a pair of flaps separated from said bottom wall and hinged along vertical lines respectively to the side walls adjacent said end wall, said flaps being foldable along said hinge lines respectively into face-to-face contact with the outer surfaces of said side walls whereby to form an access opening into said box body in the area formerly closed by said end wall, and means provided in said cover for facilitating the separation of at least one of said end flanges into relatively movable portions including a pair of tabs hinged to said top portion and foldable into positions wherein they are insertible respectively into frictional confinement between said flaps and the side walls against which said flaps are folded to hold said cover on said box body.

8. In a container comprising a box body and a telescoping cover, said box body having a pair of vertically disposed side walls, a pair of vertically disposed end walls, a bottom wall and an open top, and said cover having a top wall and a plurality of vertically disposed flanges adapted to telescope over the upper edge portions of the outer surfaces of the side and end walls of said box body to position the top wall of said cover over the open top of said box body, the improvement which comprises means provided in said box body for facilitating separation of one of said end walls of said box body into relatively movable portions comprising a pair of flaps separated from the bottom wall of said box body and hinged along vertical lines respectively to the side walls of said box body adjacent said end wall, said flaps being foldable respectively into face-to-face contact with said side walls whereby to form an access opening in said box body in the area formerly closed by said end wall, and means for holding said flaps folded against said side walls comprising a tongue for each of said flaps cut out of the adjacent side wall and so located as to be bendable to overlap an edge of the adjacent flap.

9. A container in accordance with claim 8 wherein each of said tongues is defined by a slit extending downwardly from the upper edge of the side wall in an area thereof which is overlapped by the associated folded flap and extending beyond said area in a direction such as to form an acute angle with the vertical edge of said flap.

10. A container in accordance with claim 9 wherein said cover is provided with means for facilitating the separation along predetermined lines of portions of at least one flange thereof to form a pair of tabs hinged to said cover, and said tabs being foldable into positions in which they will interlock with the folded flaps on said box body.

References Cited by the Examiner

UNITED STATES PATENTS

| | | | |
|---|---|---|---|
| 1,480,570 | 1/1924 | Schoder et al. | 206—45.21 |
| 2,313,376 | 3/1943 | Ullman | 206—45.17 |
| 2,955,734 | 10/1960 | Barton | 229—16 |

FOREIGN PATENTS

| | | | |
|---|---|---|---|
| 554,677 | 1/1960 | Belgium. | |

GEORGE O. RALSTON, *Primary Examiner.*